United States Patent [19]
Kageyama

[11] 3,972,979
[45] Aug. 3, 1976

[54] METHOD OF DECOMPOSING HALOHYDROCARBONS

[75] Inventor: Yoichi Kageyama, Yokohama, Japan

[73] Assignee: Mitsubishi Chemical Industries Ltd., Tokyo, Japan

[22] Filed: May 14, 1974

[21] Appl. No.: 469,804

[30] Foreign Application Priority Data
May 14, 1973 Japan............................ 48-53292
May 29, 1973 Japan............................ 48-60107

[52] U.S. Cl.............................. 423/240; 423/481; 423/502
[51] Int. Cl.² ................................ B01D 53/34
[58] Field of Search ........... 423/240, 241, 481, 483, 423/502, 488

[56] References Cited
UNITED STATES PATENTS
3,705,010  12/1972  Davis et al. .................... 423/502
3,845,191  10/1974  Bruce............................. 423/240

*Primary Examiner*—Earl C. Thomas
*Attorney, Agent, or Firm*—Oblon, Fisher, Spivak, McClelland & Maier

[57] ABSTRACT

Exhaust gas containing a halohydrocarbon having 1 – 10 carbon atoms and molecular oxygen is contacted with chromium oxide or a boehmite supported platinum at an elevated temperature to decompose the halohydrocarbon to carbon dioxide, water, hydrogen halide and free halogen.

4 Claims, No Drawings

METHOD OF DECOMPOSING HALOHYDROCARBONS

BACKGROUND OF THE INVENTION

1. Field of the Invention

This invention relates to a method of decomposing a halohydrocarbon by oxidative contact with a catalyst.

2. Description of the Prior Art

Exhaust gases from industry have been oxidatively treated to reduce air pollution. It is known that catalytic oxidation using a noble metal catalyst, such as platinum and palladium or an oxide catalyst, such as oxides of vanadium, chromium, manganese, iron, cobalt, nickel, copper, molybdenum and tungsten, is effective in treating exhaust gases containing carbon monoxide and hydrocarbons. However, an industrial method of catalytic oxidation of exhaust gases containing halohydrocarbons is not known, because conventional oxidizing catalysts are easily poisoned by halogen or sulfur compounds. A need exists therefore, for effective catalysts which are not poisoned by halogen compounds.

SUMMARY OF THE INVENTION

Accordingly, one object of the invention is to provide a method of decomposing halohydrocarbons, with high efficiency, by oxidation using a catalyst which maintains high catalytic activity for a long period of time.

This and other objects as will hereinafter become more readily understood by the following description can be attained by contact of a gas containing a halohydrocarbon of 1 – 10 carbon atoms and molecular oxygen at an elevated temperature. The catalyst used in this invention is chromium oxide or a boehmite supported platinum. When the chromium oxide catalyst is used, the halohydrocarbon should preferably contain 1 – 6 carbon atoms.

DETAILED DESCRIPTION OF THE PREFERRED EMBODIMENTS

The gas to be treated by the oxidative decomposition method of the invention contains a halohydrocarbon preferably having 1 – 10 carbon atoms, and a halogen component of chlorine or bromine, such as saturated halohydrocarbons, e.g. methyl chloride, ethyl chloride, dichloromethane, dichloroethanes; unsaturated halohydrocarbons, e.g. chloroethylene, dichloroethylenes; aromatic hydrocarbons, e.g. chlorobenzene, or the like; the gas can contain other oxidizable compounds together with the halohydrocarbon and these oxidizable compounds can be decomposed at the same time in accordance with the method of the invention.

Suitable catalysts include at least one catalyst selected from the group of chromium oxide and a boehmite supported platinum. Chromium oxide and boehmite supported platinum maintain high catalytic activity for a long period of time in the oxidative decomposition of halohydrocarbons.

The chromium oxide catalyst will be described first. The chromium oxide catalyst can be prepared by using any chromium compound, such as chromium nitrate, chromium chloride, chromium hydroxide, chromic anhydride. The chromium oxide can be supported on a carrier. Suitable carriers include alumina, silica, silica-alumina, mullite, cordierite, or the like. The carrier can be spherical, cylindrical, honeycomb, or related shape. Suitable honeycomb carriers are preferably 50 – 500 mm in length, more preferably 100 – 400 mm, with porosity of 0 – 90%, preferably 10 – 70%. Suitable spherical or cylindrical carriers are preferably 0.5 – 20 mm in length or diameter, more preferably 1 – 10 mm, with porosity of 0.5 – 70%.

The chromium oxide can be prepared in any desired shape by thermally decomposing the chromium compound followed by calcining to form the catalyst. When a carrier is used, the chromium compound may be supported on the carrier by a conventional method, such as impregnation, precipitation, or the like and then thermally decomposing and calcining the chromium compound. The quantity of chromium oxide supported on the carrier is 0.5 – 80% by weight, preferably 3 – 50% by weight.

The platinum catalyst supported on boehmite will now be illustrated. The boehmite carrier can be supported by other carriers, that is, the platinum must be supported on boehmite but the remainder of the catalyst need not be boehmite. A suitable carrier can be prepared by coating boehmite onto another carrier, which may be spherical, cylindrical, honeyconical or other like shape. The platinum can then be supported on the carrier by any conventional method, such as by dipping a platinum compound such as chloroplatinic acid, etc., into an aqueous solution and then reducing the compound with or without drying or calcining with hydrogen, hydrazine, formaline, sodium borohydrate, or the like. The quantity of platinum supported on the carrier is preferably 0.03 – 5% by weight.

According to the methods of this invention, the chromium oxide catalyst and the boehmite supported platinum catalyst can be combined. When both types of catalysts are mixed and placed in a catalyst bed, a relatively complicated operation is required for separating and recovering the platinum component from the waste catalyst. Accordingly, a series of catalyst beds filled with each type of catalyst alone is preferable. The catalyst bed filled with the chromium oxide catalyst is preferably placed in front of the line and the catalyst bed filled with the boehmite supported platinum catalyst in the rear of the line.

By the method of this invention, the halohydrocarbon present in the gas can be effectively oxidized and decomposed by contacting the catalyst bed with the gas containing the halohydrocarbon and the molecular oxygen, at an elevated temperature and at atmospheric or higher or lower pressure. The temperature of the catalyst bed is preferably kept at 200° – 500°C, since catalytic activity will be reduced at higher temperatures and an insufficient reaction velocity will result at lower temperature.

The gas containing the halohydrocarbon can contain other oxidizable compounds, such as hydrogen, carbon monoxide, hydrocarbons, etc. The concentration of the oxidizable compound will depend upon the heat of reaction and the catalyst bed is then kept at a suitable temperature. When the concentration of oxidizable compound is too low, the gas is heated before the reaction. On the contrary, when the concentration of oxidizable compound is too high, the heat of reaction is removed by cooling with a cooling tube inserted in the catalyst bed. Accordingly, the concentration of oxidizable compound is preferably 10 – 10,000 ppm with the chromium oxide catalyst and 10 – 50,000 ppm with the boehmite supported platinum catalyst. The space velocity of the gas is preferably 5000 – 300,000 hr$^{-1}$, and can be selected depending upon the concentration of oxidiziable compounds at the inlet or the outlet.

Having generally described the invention, a more complete understanding can be obtained by reference to certain specific examples, which are included herein for purpose of illustration only and are not intended to be limiting unless otherwise specified.

EXAMPLE 1

A reactor having a diameter of 20 mm and height of 300 mm, was filled with 5 – 22 cc of one of the following catalysts. Air containing 500 ppm each of ethylene and a halohydrocarbon listed in Table 1, was passed through the reactor under the reaction conditions listed in Table 1 to carry out the reaction. The results are shown in Table 1. No change of catalytic activity was noted after 10 days from the initiation of the reaction.

Preparation of Catalyst 1:

A γ-alumina (diameter of 4 mm and length of 4 mm) carrier was dipped into an aqueous solution of chromic acid of concentration 252 g/l ($Cr_2O_3$). The carrier was removed and dried at 100°C for half a day and calcined at 400°C for 2 hours in air to obtain Catalyst 1 wherein chromium oxide is supported on the γ-alumina carrier to the extent of about 5% by weight as Cr.

Preparation of Catalyst 2:

The same type of γ-alumina as used above was dipped into an aqueous solution of chromium nitrate of concentration 1000 g/l. The carrier was removed and treated with 4N-aqueous ammonia solution. The product was dried and calcined as set forth in the preparation of the Catalyst 1, to obtain the Catalyst 2.

Preparation of Catalyst 3:

A silica-alumina carrier (diameter of 4 mm and length of 4 mm) composed of 30% alumina and 70% silica was dipped into an aqueous solution of chromic acid of concentration 500 g/l, and was treated as set forth in the preparation of the Catalyst 1 to obtain Catalyst 3, in which chromium oxide is supported on the silica-alumina carrier to the extent of 10% by weight as Cr.

ported on the carrier to the extent of 5% by weight as metal.

Preparation of Catalyst 9

The catalyst was prepared by the method set forth in the preparation of Catalyst 1 except that an aqueous solution prepared by dissolving vanadium (V) oxide in oxalic acid was used instead of the aqueous solution of chromic acid.

Preparation of Catalyst 10

The catalyst was prepared by the method set forth in the preparation of Catalyst 1 except that an aqueous solution of ammonium molybdate was used instead of the aqueous solution of chromic acid.

Table 2

| Catalyst | metal supported | Decomposition (%) | |
|---|---|---|---|
| | | methyl chloride | ethylene |
| Catalyst - 4 | Co | 35 | 27 |
| Catalyst - 5 | Fe | 30 | 12 |
| Catalyst - 6 | Mn | 27 | 26 |
| Catalyst - 7 | Cu | 25 | 30 |
| Catalyst - 8 | Ni | 19 | 3 |
| Catalyst - 9 | V | 12 | 15 |
| Catalyst - 10 | Mo | 6 | 1 |

EXAMPLE 2

An aqueous solution of sodium hydroxide was added to an aqueous solution of aluminum nitrate to precipitate an amorphous gel. The product was treated at about 200°C in an autoclave to obtain boehmite (containing a part of the gel). The boehmite was formed into a spherical carrier having diameter of about 6 mm. The boehmite was also kneaded with water to form a slurry. A honeycomb carrier made of α-alumina was dipped into the slurry to coat boehmite onto the surface of the α-alumina. The product was calcined at 300°C to prepare a honeycomb carrier coated with boehmite. Each of two types of the carriers was dipped into an aqueous solution containing 27 g/l of chloroplatinic acid. The product was removed, dried, and then reduced at 200°C for 1 hour in hydrogen gas, to obtain the catalyst containing about 0.3% by weight of supported platinum. Air containing 500 ppm each of ethylene and methylchloride was passed through the catalyst bed filled with the above catalyst on a spherical boehmite carrier at about 400°C at a space velocity of 39,000 $hr^{-1}$. The duration of reaction after initiation and the precent decomposition of methylchloride and ethylene at the corresponding times are shown in Table 3.

Table 1

| Catalyst | Halohydrocarbon | Reaction conditions | | Decomposition (%) | |
|---|---|---|---|---|---|
| | | space velocity ($hr^{-1}$) | temp. (°C) | halo-hydro-carbon | ethylene |
| Catalyst 1 | methylchloride | 40,000 | 400 | 63 | 60 |
| Catalyst 1 | chlorobenzene | 60,000 | 350 | 98 | 69 |
| Catalyst 2 | dichloromethane | 40,000 | 350 | 55 | 58 |
| Catalyst 3 | chloroethylene | 80,000 | 350 | 31 | 55 |
| Catalyst 3 | chloroethylene | 40,000 | 400 | 75 | 79 |

Reference 1

A reactor having a diameter of 20 mm and height of 300 mm was filled with 5 – 20 cc of one of the following catalysts. Air containing 500 ppm each of ethylene and methylchloride was passed through the reactor at 400°C at a space velocity of 40,000 $hr^{-1}$, to carry out the reaction. The results are shown in Table 2.

Preparation of Catalysts 4 – 8

Each of the catalysts was prepared by the method set forth in the preparation of Catalyst 1 except that an aqueous solution of a nitrate was used instead of chromic acid: cobalt nitrate in Catalyst 4, ferric nitrate in Catalyst 6; copper nitrate in Catalyst 7; nickel nitrate in Catalyst 8. Each catalyst contained metal oxide sup- Table 3

| Duration (hr.) | 5 | 10 | 30 | 50 | 100 |
|---|---|---|---|---|---|
| Decomposition (%) methylchloride | 80 | 79 | 79 | 79 | 79 |

Table 3-continued

| | | | | | |
|---|---|---|---|---|---|
| ethylchloride | 92 | 92 | 92 | 92 | 92 |

EXAMPLE 3

The oxidative decomposition of Example 2 was repeated except that the catalyst was 0.3% by weight of platinum supported on a honeycomb carrier coated with boehmite and air containing ethylchloride instead of methylchloride was passed. The results are shown in Table 4.

Table 4

| Duration (hr.) | 5 | 20 | 50 | 100 | 200 |
|---|---|---|---|---|---|
| Decomposition (%) ethylchloride | 93 | 93 | 93 | 93 | 93 |
| ethylene | 96 | 96 | 96 | 96 | 96 |

EXAMPLE 4

A spherical boehmite carrier was dipped into an aqueous solution of chloroplatinic acid. The product was removed, dried and then reduced with an aqueous solution containing 2% $NaBH_4$ to prepare the catalyst containing 0.3% by weight of platinum supported on the carrier. The air of Example 2 was passed through the catalyst bed filled with the catalyst heated at 380°C at a space velocity of 50,000 $hr^{-1}$. The results are shown in Table 5.

Table 5

| Duration (hr.) | 3 | 10 | 50 |
|---|---|---|---|
| Decomposition (%) methylchloride | 55 | 55 | 55 |
| ethylene | 87 | 87 | 87 |

Reference 2

The oxidative decomposition of Example 2 was repeated except that a catalyst prepared by supporting chloroplatinic acid on a commercial γ-alumina carrier to the extent of 0.3% by weight as Pt and then reducing the acid with hydrogen was used. The results are shown in Table 6.

Table 6

| Duration (hr.) | 3 | 5 | 10 |
|---|---|---|---|
| Decomposition (%) methylchloride | 55 | 52 | 48 |
| ethylene | 87 | 85 | 83 |

Reference 3

A catalyst was prepared by supporting chloroplatinic acid on a α-aluminum honeycomb carrier to the extent of 0.3% by weight as Pt, and then reducing the acid with hydrogen. The oxidative decomposition of Example 3 was repeated substituting the above catalyst. The results are shown in Table 7.

Table 7

| Duration (hr.) | 3 | 5 | 10 | 20 |
|---|---|---|---|---|
| Decomposition (%) ethylchloride | 60 | 62 | 53 | 45 |
| ethylene | 98 | 98 | 96 | 93 |

Reference 4

A catalyst was prepared by supporting chloroplatinic acid on a mullite (3 $Al_2O_3$ . $2SiO_2$) honeycomb carrier to the extent of 0.3% by weight of Pt, and then reducing the acid with hydrogen. The oxidative decomposition of Example 2 was repeated substituting the above catalyst. The results are shown in Table 8.

Table 8

| Duration (hr.) | 3 | 5 |
|---|---|---|
| Decomposition (%) methylchloride | 3 | 0 |
| ethylene | 73 | 70 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of oxidatively decomposing a chlorohydrocarbon having from 1 to 10 carbon atoms to carbon dioxide, water, hydrogen chloride and free chlorine which comprises contacting an exhaust gas containing from 10 – 50,000 ppm of said chlorohydrocarbon and molecular oxygen with a catalytic amount of boehmite-supported platinum catalyst at a temperature of from 200° – 500°C.

2. The process of claim 1, wherein the catalyst contains 0.03 – 5% by weight of platinum supported on a boehmite carrier.

3. The process of claim 1, wherein the space velocity of the gas is 5,000 – 300,000 $hr^{-1}$.

4. The process of claim 1, wherein the chlorohydrocarbon is a chlorohydrocarbon having 1–2 carbon atoms.

* * * * *